United States Patent
Barnes et al.

(10) Patent No.: US 10,476,938 B2
(45) Date of Patent: *Nov. 12, 2019

(54) SYSTEM AND METHOD FOR MULTITENANCY STORE IN A MULTITENANT APPLICATION SERVER ENVIRONMENT

(71) Applicant: ORACLE INTERNATIONAL CORPORATION, Redwood Shores, CA (US)

(72) Inventors: Thomas Barnes, Whitehouse, NJ (US); Dongbo Xiao, Edison, NJ (US); Donald L. King, Jr., Darien, CT (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 14/865,758

(22) Filed: Sep. 25, 2015

(65) Prior Publication Data

US 2016/0094405 A1    Mar. 31, 2016

Related U.S. Application Data

(60) Provisional application No. 62/056,432, filed on Sep. 26, 2014.

(51) Int. Cl.
*H04L 29/08* (2006.01)
*H04L 12/24* (2006.01)

(52) U.S. Cl.
CPC .......... *H04L 67/10* (2013.01); *H04L 41/5041* (2013.01); *H04L 41/5093* (2013.01); *H04L 67/1002* (2013.01)

(58) Field of Classification Search
CPC . H04L 67/1025; H04L 67/10; H04L 67/1002; H04L 67/42; H04L 47/783;
(Continued)

(56) References Cited

U.S. PATENT DOCUMENTS 8,326,876 B1    12/2012  Venkataraman et al.
8,898,800 B1 *  11/2014  Fredinburg ......... G06F 21/6245
                                                      726/26
(Continued)

FOREIGN PATENT DOCUMENTS

CN    101639835    2/2010
CN    102170457    8/2011
(Continued)

OTHER PUBLICATIONS

BEA, "BEA WebLogic Server: Configuring and Managing WebLogic JMS", Version 10.0, Mar. 30, 2007.*
(Continued)

*Primary Examiner* — Dhairya A Patel
*Assistant Examiner* — Sandarva Khanal
(74) *Attorney, Agent, or Firm* — Tucker Ellis LLP

(57) ABSTRACT

In accordance with an embodiment, a system and method provides a messaging service in a multitenant application server environment that includes a domain configuration defining an application server domain for execution of the software applications, and one or more partitions of the domain. Each partition is associated with a partition configuration and provides a subdivision of the domain. One or more resource groups enable partition-specific information for one or more deployable resources. Java message service (JMS) resources are defined within a resource group, and instantiated within a partition to enable messaging for applications deployed within the partition and between partitions. A custom store is defined within each of the resource groups (Continued)

for use by the JMS resources. Components of the custom store are fully partition scoped.

12 Claims, 6 Drawing Sheets

(58) Field of Classification Search
CPC ..... H04L 41/20; H04L 41/12; H04L 41/5041; H04L 41/5093; H04L 41/0843; H04L 41/0893; G06F 9/5072; G06F 9/5077; G06F 9/46
See application file for complete search history.

(56) References Cited

U.S. PATENT DOCUMENTS

| | | | |
|---|---|---|---|
| 2004/0015859 A1* | 1/2004 | Potter | G06F 9/44521 717/120 |
| 2004/0148569 A1* | 7/2004 | Sengodan | G06F 17/218 715/239 |
| 2006/0195619 A1* | 8/2006 | Arndt | G06F 9/45537 710/1 |
| 2012/0072597 A1 | 3/2012 | Teather et al. | |
| 2013/0232497 A1* | 9/2013 | Jalagam | G06F 9/5072 718/104 |
| 2015/0207758 A1 | 7/2015 | Mordani et al. | |
| 2015/0370549 A1 | 12/2015 | Zhang et al. | |
| 2015/0370608 A1 | 12/2015 | Dipol et al. | |
| 2015/0372883 A1 | 12/2015 | Lam et al. | |
| 2015/0372887 A1 | 12/2015 | Inamdar et al. | |
| 2015/0372936 A1 | 12/2015 | Kasso et al. | |
| 2015/0372937 A1 | 12/2015 | Lai et al. | |
| 2015/0373004 A1 | 12/2015 | Hopkins et al. | |
| 2015/0373097 A1 | 12/2015 | Konkus et al. | |
| 2015/0373098 A1 | 12/2015 | Mordani et al. | |
| 2015/0373099 A1 | 12/2015 | Dipol et al. | |
| 2015/0373117 A1 | 12/2015 | Gleyzer et al. | |
| 2015/0378641 A1 | 12/2015 | Patel et al. | |
| 2015/0378938 A1 | 12/2015 | Patel et al. | |
| 2016/0013983 A1 | 1/2016 | Lu et al. | |
| 2016/0014038 A1 | 1/2016 | Thyagarajan et al. | |
| 2016/0014191 A1 | 1/2016 | Liu et al. | |
| 2016/0014212 A1 | 1/2016 | Zhang et al. | |
| 2016/0020949 A1 | 1/2016 | Mares et al. | |
| 2016/0085543 A1 | 3/2016 | Islam et al. | |
| 2016/0088108 A1 | 3/2016 | Felts et al. | |
| 2016/0092278 A1 | 3/2016 | Quinn et al. | |
| 2016/0092319 A1 | 3/2016 | Parkinson et al. | |
| 2016/0092342 A1 | 3/2016 | Inamdar et al. | |
| 2016/0094385 A1 | 3/2016 | Bower et al. | |
| 2016/0094403 A1 | 3/2016 | Somogyi et al. | |
| 2016/0094404 A1 | 3/2016 | Kasso et al. | |
| 2016/0094406 A1 | 3/2016 | Phan et al. | |
| 2016/0094407 A1 | 3/2016 | Parkinson et al. | |
| 2016/0094408 A1 | 3/2016 | Segu | |
| 2016/0094473 A1 | 3/2016 | Mordani et al. | |
| 2016/0094474 A1 | 3/2016 | Sahoo et al. | |
| 2016/0094478 A1 | 3/2016 | Quinn et al. | |
| 2016/0094484 A1 | 3/2016 | Mordani et al. | |
| 2016/0094486 A1 | 3/2016 | Sahoo et al. | |
| 2016/0094498 A1 | 3/2016 | Xiao et al. | |
| 2016/0094510 A1 | 3/2016 | Xiao et al. | |
| 2016/0094582 A1 | 3/2016 | Watson et al. | |
| 2016/0094583 A1 | 3/2016 | Bower | |
| 2016/0094624 A1 | 3/2016 | Mordani et al. | |
| 2016/0094625 A1 | 3/2016 | Sengodan et al. | |
| 2016/0094626 A1 | 3/2016 | Bajaj et al. | |
| 2016/0094627 A1 | 3/2016 | Subramanyam et al. | |
| 2016/0094635 A1 | 3/2016 | Kannan et al. | |
| 2016/0094647 A1 | 3/2016 | Mordani et al. | |
| 2016/0142506 A1 | 5/2016 | Sahoo et al. | |
| 2016/0231998 A1 | 8/2016 | Islam et al. | |
| 2016/0328268 A1 | 11/2016 | Islam et al. | |
| 2017/0017494 A1 | 1/2017 | Patel et al. | |
| 2017/0019467 A1 | 1/2017 | Inamdar et al. | |
| 2017/0019485 A1 | 1/2017 | Dorr et al. | |
| 2017/0034071 A1 | 2/2017 | Sidde et al. | |
| 2017/0116041 A1 | 4/2017 | Nanjudaswamy | |
| 2017/0118137 A1 | 4/2017 | Nanjudaswamy | |
| 2017/0126742 A1 | 5/2017 | Hopkins et al. | |
| 2017/0192772 A1 | 7/2017 | Islam et al. | |

FOREIGN PATENT DOCUMENTS

| | | |
|---|---|---|
| CN | 102333115 | 1/2012 |
| CN | 102571821 | 7/2012 |
| CN | 102609271 | 7/2012 |
| CN | 102932404 | 2/2013 |
| CN | 102932405 | 2/2013 |
| CN | 103455512 | 12/2013 |
| CN | 102571916 | 11/2015 |

OTHER PUBLICATIONS

BEA, WebLogic Server: Configuring and Managing WebLogic JMS, Version 10.0, Revised: Mar. 30, 2007. (Year: 2007).*

* cited by examiner

SYSTEM AND METHOD FOR MULTITENANCY STORE IN A MULTITENANT APPLICATION SERVER ENVIRONMENT

CROSS-REFERENCE TO RELATED APPLICATIONS

This application claims the benefit of priority to U.S. Provisional Application titled "SYSTEM AND METHOD FOR MULTITENANCY STORE IN A MULTITENANT APPLICATION SERVER ENVIRONMENT", Application No. 62/056,432, filed Sep. 26, 2014; and is related to U.S. Provisional Application titled "SYSTEM AND METHOD FOR SUPPORTING MULTITENANCY IN AN APPLICATION SERVER, CLOUD, OR OTHER ENVIRONMENT", Application No. 61/929,888, filed Jan. 21, 2014; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to environments for operating application software, and are particularly related to systems and methods for providing and administering messaging services in a partitionable environment for operating application software, such as a multi-tenant cloud or application server environment.

BACKGROUND

Software application servers, examples of which include Oracle WebLogic Server (WLS) and GlassFish, generally provide a managed environment for running enterprise software applications. Recently, technologies have also been developed for use in cloud environments, which allow users or tenants to develop and run their applications within the cloud environment, and to take advantage of distributed resources provided by the environment.

The Java Message Service (JMS) application programming interface (API) is an API usable in application server environments for sending messages between two or more clients. JMS is a messaging standard that allows application components to create, send, receive, and read messages, allowing communication between different components of a distributed application to be loosely coupled, reliable, and asynchronous.

SUMMARY

In accordance with an embodiment, described herein is a system and method for providing a messaging service in a multitenant application server environment. A plurality of deployable resources are usable within the multitenant application server environment and groupings of deployable resources are defined by one or more resource group templates within a domain. One or more partitions are provided, with each partition providing an administrative and runtime subdivision of the domain that can be associated with a tenant. One or more Java message service (JMS) resources are defined within a resource group template or a resource group, and instantiated within a partition from one or more partitions to enable messaging for applications deployed within the partition and between one or more partitions.

In accordance with an embodiment, a system and method for integrating JMS in a multitenant application server environment further comprises a custom store defined within each of one or more resource group templates for use by JMS resources. All components are fully partition scoped and exist in an isolated JNDI name-space (if applicable), an isolated directory location (if applicable), and use fully partition scoped runtime MBeans and configuration MBeans.

DETAILED DESCRIPTION

In accordance with an embodiment, described herein is a system and method for supporting messaging services in a partitionable environment for operating application software.

In a cluster, JMS components typically reside on different servers within that cluster, and must be able to work together to enable communication between applications executing on the different servers, as well as between applications executing on different clusters within a partition. Further, under some circumstances it will be desirable to communicate across partitions, or between the domain level and partitions.
Application Server (e.g., Multi-Tenant, MT) Environment FIG. 1 illustrates a system for supporting multi-tenancy in an application server, cloud, or other environment, in accordance with an embodiment.

Figure 1:
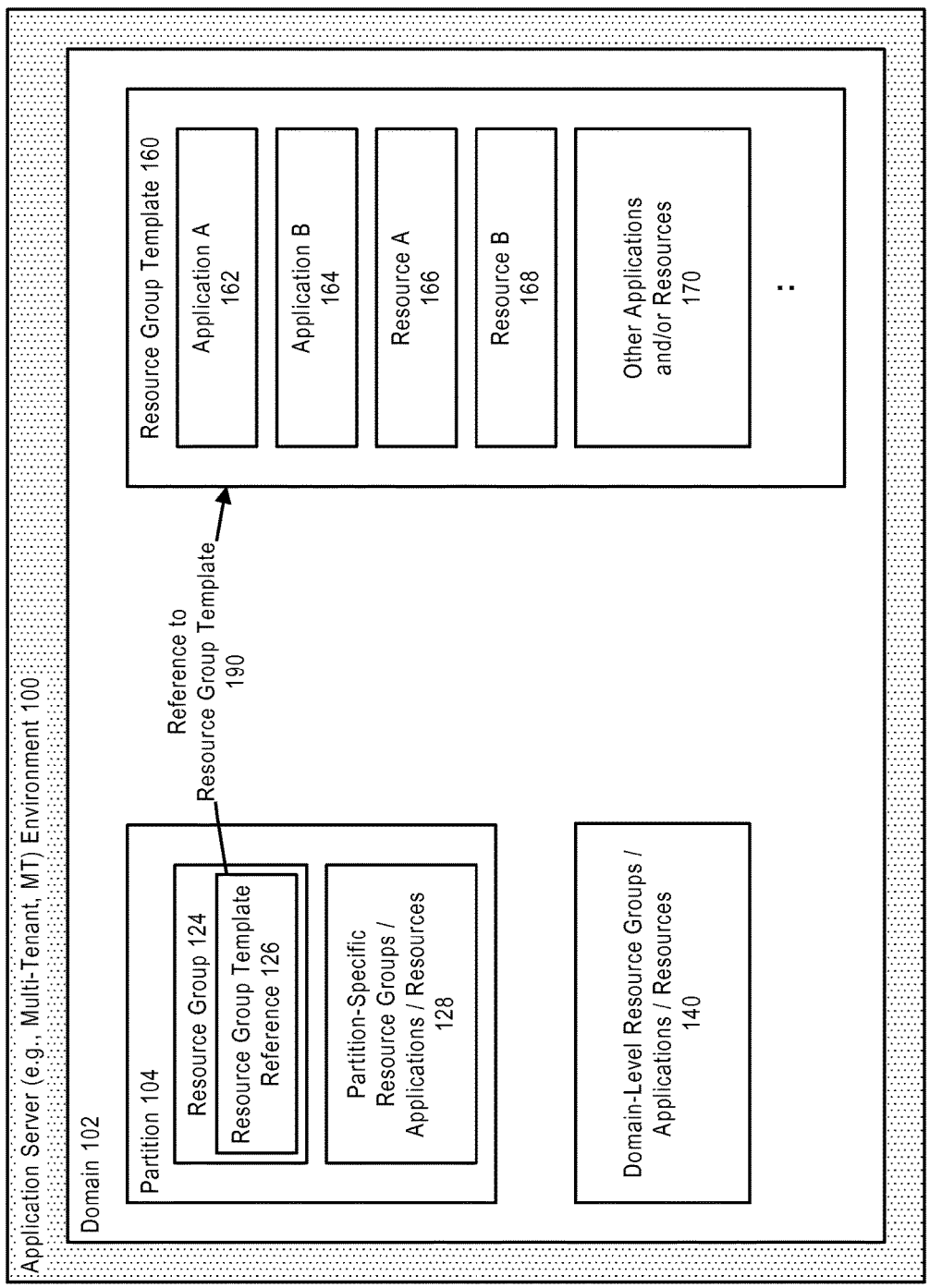
FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
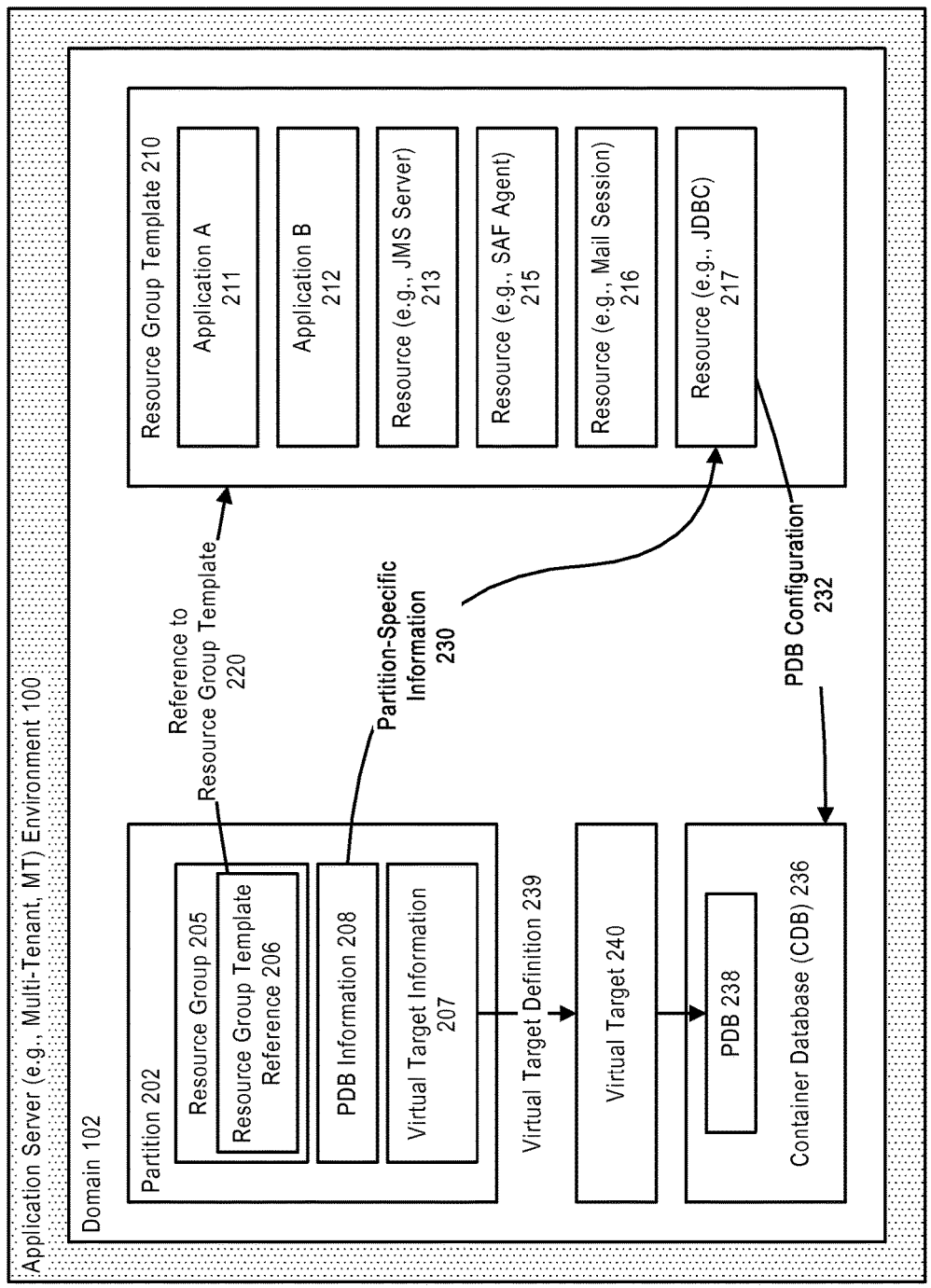
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition. Further, foreign JMS server overrides contain property key values that can provide overrides for resource group templates.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
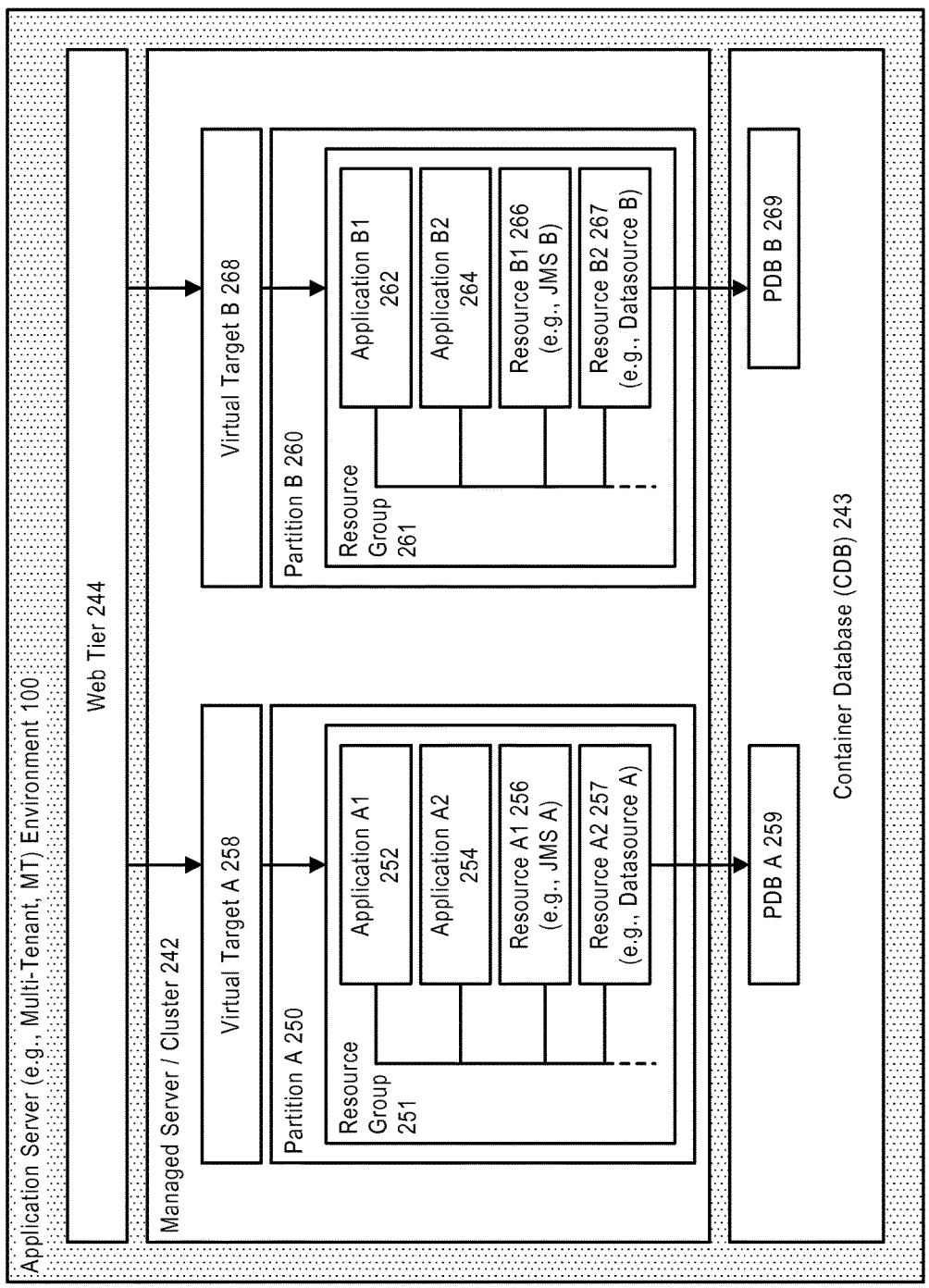
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates. Further, foreign JMS server overrides contain property key values that can provide overrides for resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a software as a service (SaaS) use case, various partition-level resource groups can refer to domain-level resource group templates; while in a platform as a service (PaaS) use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level. Partition level configuration can instead be specified in the resource group template through the use of macros, other overrides, or property name/value pairs, or, for example, through the use of foreign JMS server overrides which contain property key values that can provide overrides for resource group templates.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
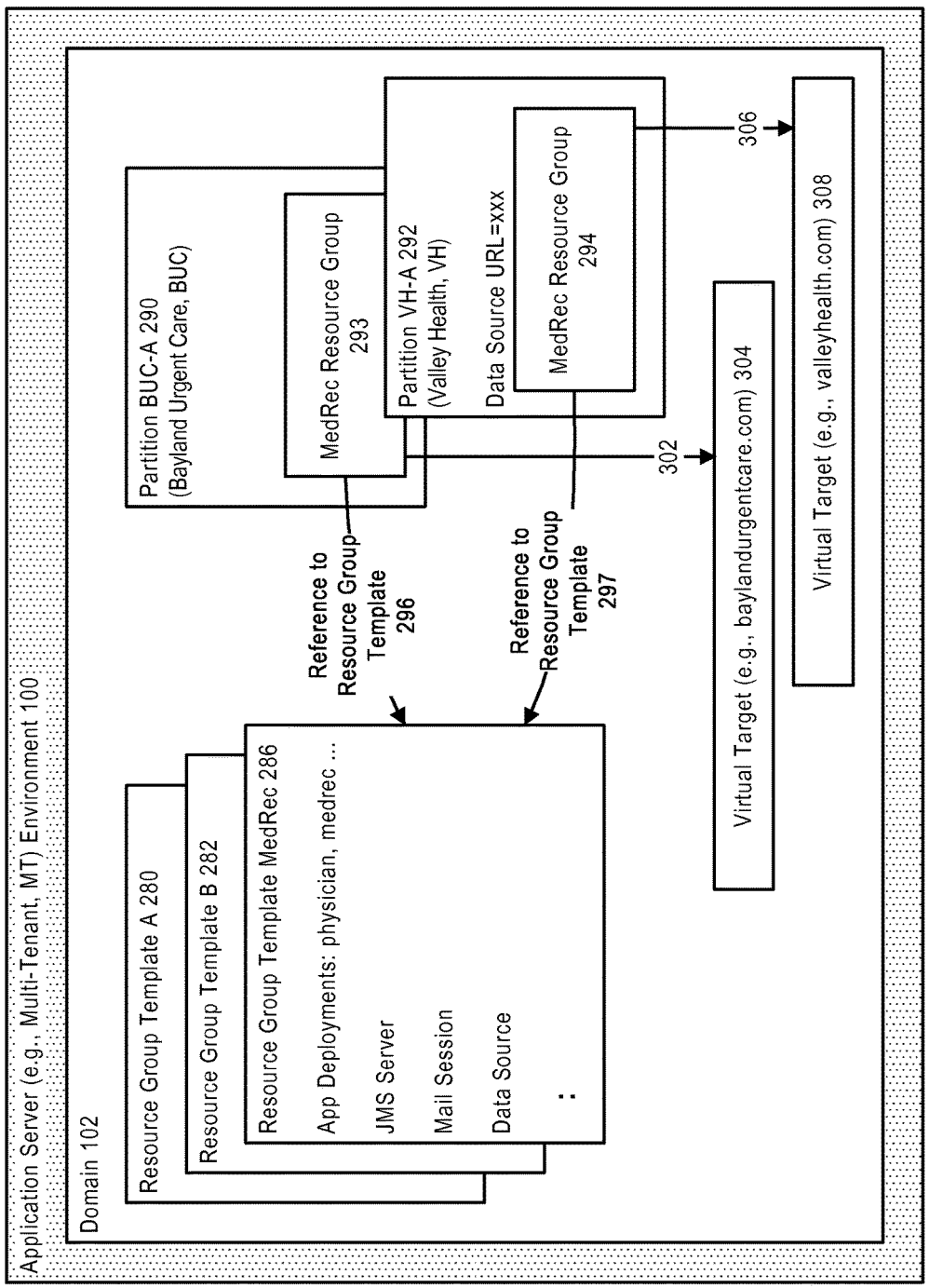
FIG. 4 illustrates an exemplary use of resource group templates, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template (e.g., Resource Group Template A 280, Resource Group Template B 282) can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth-.com 308 associated with the VH-A partition, for use by the Valley Health tenant.

Figure 5:
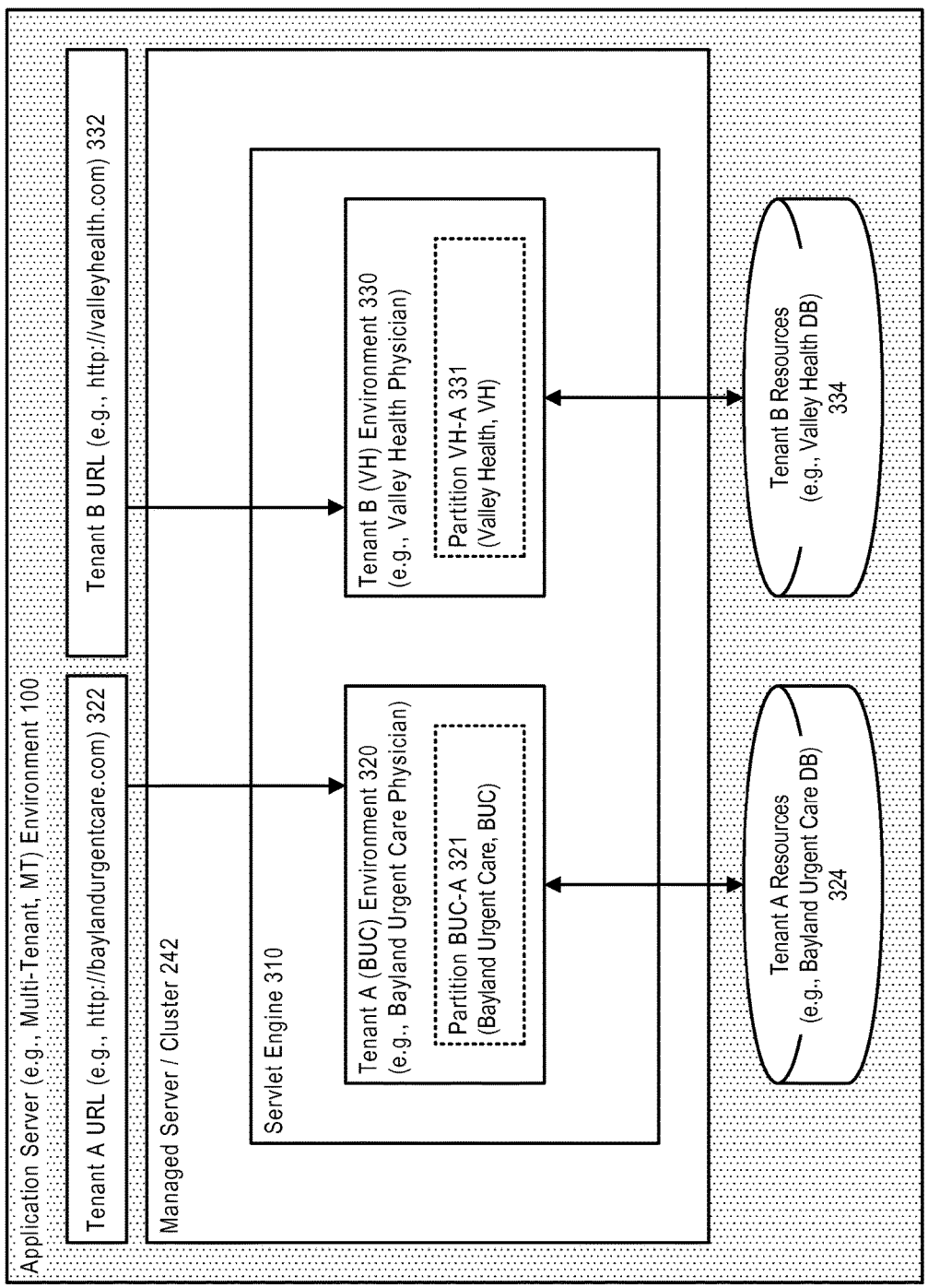
FIG. 5 illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a Bayland urgent care database, or a valley health database respectively. The database instances can use compatible schemas, since the same application code will execute against both databases. When the system starts the partitions, it can create the virtual targets and connection pools to the respective database instances.

Messaging Components for Use in a Partitionable, Multi-Tenant Environment

In accordance with an embodiment, described herein is a system and method for implementing a messaging service that can support cluster targeting in a partitionable, multi-tenant environment for operating software applications. Messaging services will be described hereinafter in the context of Java Message Service (JMS), including exemplary deployments, features and configurations of JMS. However, one skilled in the art will appreciate that the description of JMS is merely exemplary, that JMS is merely one type of messaging service and that embodiments are intended to be applicable to any messaging service usable within a partitionable environment for operating software applications. Further, one skilled in the art will appreciate that a messaging service is merely one type of service, and that embodiments are intended to be applicable to other services, such as a transaction manager, usable within a partitionable environment for operating software applications.

JMS services comprise core JMS components including JMS servers, JMS system modules, JMS application modules, JMS Java clients, C clients and .NET clients, public helper APIs, and path services. JMS services further comprise internal components such as a dispatcher, front-end, back-end and messaging kernel. Further, store-and-forward (SAF) services comprise agents for both JMS SAF and the web services reliable messaging (WSRM) for WebLogic Java API for XML-based remote procedure call (JAX-RPC) web services implementation, and messaging integration comprises integration components for arbitrary JMS providers including messaging bridges, JMS pools, and foreign JMS servers.

Figure 6:
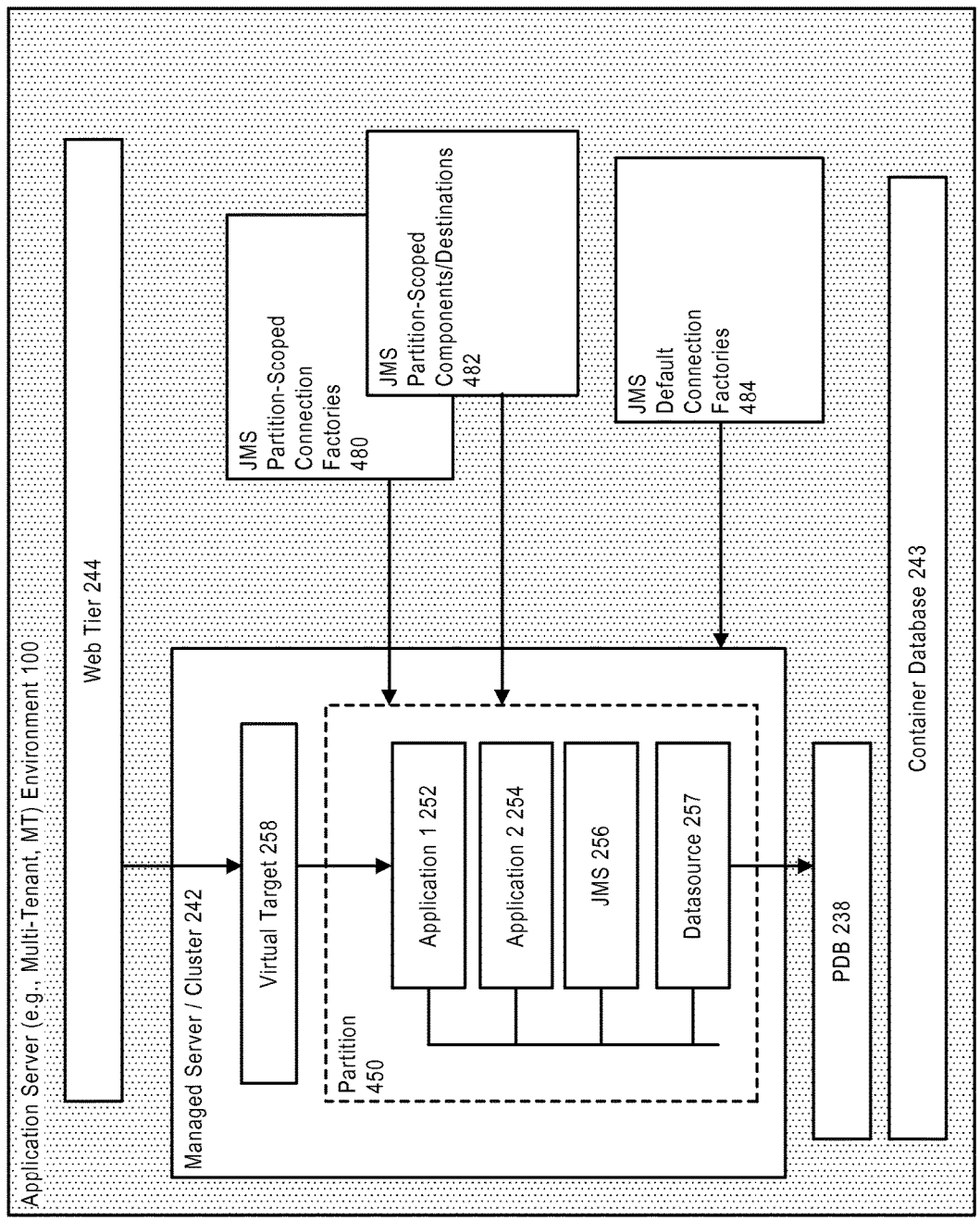
FIG. 6 illustrates messaging in a multitenant application server environment, in accordance with an embodiment.

FIG. 6 illustrates messaging in a multitenant application server environment, in accordance with an embodiment. JMS messaging components 480, 482 for use in a partitionable, multi-tenant environment, including JMS servers, path services, SAF agents, messaging bridges, JMS foreign server, JMS system modules, and JMS application modules, can be deployed in a partition through resource groups and resource group templates. JMS wrapper/pools can be referenced by an application (e.g., a Java EE application) within a partition using resource references. Partitions can be isolated with respect to one another if a resource group template is referenced by partitions on multiple clusters.

JMS resources can be defined within a resource group template or a resource group and instantiated within a partition to support SaaS and consolidation use cases. JMS components are partition scoped, exist in an isolated JNDI name-space, use partition scoped runtime/configuration MBeans and use isolated persistent storage. JMS connection factories and their child resources are associated with the partition for which they are configured. Default connection factories 484 are deployable to the domain and are available to applications within partitions. Default connection factories are scoped (isolated) to the domain level or to their partitions. They are not directly shared across partitions except that all custom factories (custom and default) are available across partitions using the "domain:" and "partition:" JNDI name prefix, or using URL locators that resolve to the different location.

In accordance with an embodiment, the operations, administration and management (OA&M) service automatically decorates configuration and deployment MBean names with their local partition name, or provides a mechanism for JMS components to do so. The core OA&M, deployment, networking, security and diagnostics services are partition aware by default. For example, when a logger logs a message, the partition ID of the current thread will show in a supplemental attribute of a log message unless the log message is specifically marked as "exclude_partitioned". Core service callbacks, including OA&M, JNDI, diagnostics, and deployment service callbacks, include the local partition ID on the callback thread.

Work manager instances, once created, are associated with a particular partition and run jobs with the partition ID of that partition on the execute thread. If a work manager name exists at the domain level, a findOrCreateWorkManager( ) call from a partition context does not return the global work manager with that name if a local work manager with that name does not exist. Rather, a partition-scoped work manager with that name is created. A timer manager delegates partition association to the work manager instance that is associated with the timer manager.

Enterprise Javabeans (EJBs), servlets, and message driven beans (MDBs) are fully partitioned. For example, a particular instantiated partition scoped MDB or EJB bean will have the partition ID of its host partition on the current thread.

Data sources and WebLogic remote method invocation (RMI) and/or EJB smart stubs, including JMS connection factory stubs, are associated with the partition from which they are obtained, and do not change their partition based on the current partition on the current thread. APIs are provided for obtaining the partition ID of the current thread, for overriding the partition ID of the current thread with a different partition ID and for obtaining the partition of a smart stub.

A client or partition is able to communicate with one or more destinations on multiple partitions within the same cluster, within different clusters, or within different domains, and can interoperate with previous versions of application servers (e.g., WebLogic servers) that are not executing within partitioned environments. For example, old clients are able to send messages to a particular partition, and a partitioned application will be able to send messages to an application server that is executing in a non-partitioned environment.

Partition Scoped JMS Services

Domain level JMS resource configurations, JMS system resources and JMS modules embedded in deployable modules are supported at the domain level for applications built for non-partitionable or legacy environments.

As mentioned above, in accordance with an embodiment, JMS resources are available for applications for use in partitionable, multi-tenant environments at the partition level via resource group templates or resource groups. JMS resources, such as connection factories, destinations, message bridges and path services are partition scoped, with each resource either belonging to the domain or a particular partition. A resource can exist in multiple partitions with the same JNDI name. An application that uses the correct URL when it creates an initial context to the domain or partition will access the correct resources via JNDI lookup operations.

Persistent application data that a JMS component holds are stored in persistent storage, such as a file store, replicated store or JDBC store. Each partition includes an instance of a file store and replicated store so that the data are in different locations in the file system if configured properly, and JMS applications can achieve isolation of application data, system resources, as well as security, between partitions. Each partition can choose to use a different PDB instance in the same database when using a JDBC store.

A JMS component ensures that system resources, such as threads and memory, are accounted for under the right partition. The JMS component replies on some of the core services to provide object-based partition association.

JMS Server, SAF Agent, and Path Service

In accordance with an embodiment, core messaging components include JMS servers, SAF agents, and path services. A JMS server can include, for example, a WebLogic server service that provides messaging capability via Java EE standard interfaces and additional WebLogic extensions. A SAF agent can provide a store-and-forward service to WebLogic JMS. A path service is a singleton service in a cluster that provides persistent routing data for JMS server and SAF agent distributed destination members. Each partition includes a path service in each cluster and an MBean legal check prevents a path service from being configured in more than one resource group in a partition in the same cluster.

The core messaging components are deployable in a partition via resource groups and resource group templates, and inherit the target of the resource group and partition to which they belong. An exception is thrown if a resource within a resource group has its own target. For non-partitionable environments, or other legacy configurations, configuration entities are directly targeted to a server, a cluster, or a migratable target. In accordance with an embodiment, a migration tool can be used to null out the targeting of existing resources when migrating the resources to a partitionable, multi-tenant environment, for example from a non-partitionable environment (e.g., a legacy environment).

A cloned instance of a resource includes a name that is automatically decorated with the local partition name. Instance names can be generated based on configuration MBean names, which are automatically decorated with the current partition name by the OA&M service. Cluster targeted JMS server and SAF agent names embed the name of an application server (e.g., a WebLogic server). For further disambiguation some internal artifacts, such as XA resources, are decorated with the current domain name.

Integration with Work Managers

Messaging components for non-partitionable and legacy environments (e.g., WebLogic servers) use system and default work managers in various places. In addition, they create a few different dedicated custom work managers for internal messaging use.

In accordance with an embodiment, messaging components for a partitionable, multi-tenant environment can support thread isolation via a default work manager in each partition. For example, if a WorkManagerFactory.getInstance( ).getDefault( ) is called in the context of partitionA, it will provide the default work manager for partitionA. If a request is scheduled using this default work manager from any thread with any partition context, the context of partitionA will be in the execute thread when the request is executed.

Further, when a WorkManagerFactory.getInstance( ).findOrCreate( ) is called within a partition context, a partition-scoped work manager with the given name is created if none is found associated with the partition, even if there is a same-named work manager in the global scope. The work manager that is created will behave as would a default work manager for a partition. Still further, each request can optionally override the partition of a work manager on a per request basis via a ComponentRequest interface or a schedule( ) method. For partition scoped JMS components, partition-specific work managers are used when possible.

Integration with JTA Transactions

In accordance with an embodiment, messaging components integrate with JTA by creating XAResources via the store component, start and commit transactions, and enlist in transactions. JTA is substantially non-partitioned, except that default tx timeouts are settable at the partition level and runtime diagnostics filter by tenant.

WebLogic JMS will implicitly decorate its partitioned XAResource names with the appropriate partition name. The store XA resource name is constructed based on the store MBean name, and the MBean name of a partitioned store will be decorated with the partition name by OA&M. Global transactions can cross partition boundaries. JMS ensures that the partition ID of the current partition is on the current thread for all JTA calls.

Partition-Scoped Monitoring/Diagnostics/Logging

In accordance with an embodiment, administrators of a partitionable, multi-tenant environment can monitor messaging runtime state, monitor statistics, and perform runtime operations via JMS runtime MBeans. For partition-scoped JMS resources, the runtime MBeans are created and registered with the administration server in the context of a partition.

Messaging components can register the top level MBeans (e.g., JMSRuntime, SAFRuntime, PathServiceRuntime, JMSPooledConnectionRuntime, and MessagingBridgeRuntime) with the right partition MBean instance to achieve correct runtime MBean hierarchy. For the runtime MBeans that are corresponding to a configuration MBean, their names are derived from the name of the configuration MBean, which are automatically decorated with their partition name. Optionally, the partition information can be stripped from the names of those runtime MBeans.

For domain and server logs in a non-partitionable or legacy environment (e.g., WebLogic server), JMS components write log messages into server and domain log files. In a partitionable, multi-tenant environment, log records are identified which must not be generated in the context of a partition. The current partition in partitioned component log messages is reported by default. The logging framework ensures that this happens automatically based on the partition ID of the current thread. The "exclude_partitioned" attribute is set in the catalog entry of a log message for partitioned component log messages that should not be exposed to a partition administrator.

For JMS messaging life-cycle logs, JMS server and SAF agent can optionally be configured to log application message lifecycle events to a dedicated log file location. In a partitionable, multi-tenant environment, if the JMS server or SAF agent is in a partition, the name of the log file is modified to contain the partition information, for example the partition name.

Partition-specific log files can be retained in a partition-specific directory if a relative location is configured. By default, these log files will be in the partition specific directory in the domain directory, although an administrator can configure an absolute path.

When image capture is initiated by a partition administrator manually, or with a watch rule in a partition scoped WLDF system resource, only partition specific content will be included in the result diagnostic image. Diagnostic image capture callbacks will have the expected partition ID on the callback thread.

JMS enables special operations with diagnostics contexts, including propagating it from a sender thread, to its messages, and finally on to the receiver of the message. In accordance with an embodiment, in a partitionable, multi-tenant environment, as long as a JMS component has the right partition associated with the current ComponentInvocationContext when the same thread transits to different partitions, the partition info in the diagnostics context will be correct.

Integration with HA/ASM

In accordance with an embodiment, JMS can leverage high availability (HA) and/or cluster frameworks in a partitionable, multi-tenant environment to provide high availability, scalable messaging and automatic service migration (ASM).

Integration with the Timer Service

Messaging components use a timer service for various timeout and periodical operations. Each timer manager is associated with a work manager. A timer manager is scope to a partition implicitly and transitively by specifying a partition scoped work manager for use in the timer's callbacks. If a work manager is not specified, a default work manager is used. The work manager ensures that the execute thread of a callback will have the right partition ID.

The timer manager by default delegates partition context association to the work manager that is specified when the timer manager is created. The timer listener type has nothing to do with the partition context propagation, and similarly the context on the thread when a timer is scheduled has nothing to do with the partition context propagation.

Integration with Partition Life-Cycle

In accordance with an embodiment, a partitionable, multi-tenant environment can support partition scoped life-cycle operations, which includes the shutdown and restart of individual resource groups or entire partitions independently of the shutdown and restart of individual JVMs or clusters. For example, if a resource group is shutdown and it contains JMS server configuration, the JMS servers configured within the resource group will shutdown while the remaining JMS servers in the domain will continue to run.

Integration with Partition Configuration Migration

In accordance with an embodiment, a partitionable, multi-tenant environment can support partition migration from one cluster to another cluster. As described above with respect to JMS stores, partition migration is problematic in general for messaging component state as application data may be trapped in an old location. In order to avoid data loss, application messages can be required to be completely drained and all pending transactions completed before undeploying or removing a JMS server or SAF Agent.

Resource group migration from one cluster to another within a partition is supported for AQ JMS, as AQ JMS generally doesn't have singleton data that's tied to a cluster. AQ JMS supports resource group multi-targeting, resource group data migration and JNDI bind/unbind, and partially supports client transparency.

Resource multi-targeting is a resource group migration feature that allows a resource group to temporarily run concurrently in two clusters. Resource group data migration stores messages in the database in a central location accessible from either cluster that participates in a resource group migration. JNDI bind/unbind support provides that when a resource group bootstraps, its foreign JMS mappings are bound into its partition's name-space in the current cluster. When a resource group migrates away from a cluster, any of its foreign JMS mappings will be unbound from JNDI.

Client transparency is partially supported in that during a migration, server side applications may generate exceptions and log messages depending on the nature of the application and the order that applications and services are shutdown. Java SE AQ JMS clients will get exceptions on an attempt to use a WebLogic JNDI context connected a server that's been cycled for zero down time—and will need to recreate their JNDI context.

JMX MBean Naming

In accordance with an embodiment, the OA&M layer decorates configuration MBeans and JMS system resources with the name of the Partition when it clones those configuration artifacts in a resource group template. The syntax is config-name$partition-name (for example, MedRec-jms-$ValleyHealth). The PartitionRuntimeMBean is added into the runtime MBeans hierarchy between ServerRuntimeMBean and the root runtime MBean of a component (say JMSRuntimeMBean).

Integration of Messaging with Stores

In a non-partitionable environment or legacy system, multiple types of stores are used, including, for example, file stores, JDBC stores and replicated stores. Each application server includes one default file store used by the messaging components as well as non-messaging components including JTA and EJB Timers. JMS servers, SAF agents, and path services can use either custom configured stores or a default file store to persist state.

In accordance with an embodiment, in a partitionable, multi-tenant environment does not include a default store for each partition, and in order to ensure that data is fully isolated, partitioned services including JMS services are prevented from using a domain scoped default store.

Custom stores are defined within a resource group template or a resource group and instantiated within a partition. Typically, a system administrator configures store components within a resource group template and a partition administrator is given permission to configure store components within a resource group. MBean legal checks require that partitioned JMS components are configured to reference a custom store from their local resource group. Store components are fully partition scoped and use partition scoped runtime MBeans and configuration MBeans. Import and export of partitioned file store data is prevented, as is migration of file store data from one cluster to another.

There can be multiple custom configured stores per application server or cluster. Custom configured stores are separately configured and targeted, and can be targeted to an application server (e.g., a WebLogic Server), a migratable target, or a cluster. A custom configured store can be used by JMS servers, SAF agents, or path services. Within a partitionable environment, stores in a partition explicitly inherit the targeting of the partition. Files for custom file stores within a partition are located in the system directory of the partition by default. A file store uses the top directory of the current partition as the base directory for relative paths.

A replicated store stores data in local node memory (e.g., Exalogic local node memory) and replicates it to memory on a second node providing high availability. JMS uses a replicated store to persist data to a daemon cluster using configuration information. A region in a daemon cluster corresponds to a file store file or JDBC store table and the name of the region includes the partition name. File names for custom replicated stores within a partition include a partition name in their directory path. Custom replicated stores require a dedicated separate NFS mount and do not use the partition file system for the application server. Configuring a replicated store in a resource group template and/or resource group is not permitted and migrating an existing domain configuration that contains replicated stores to a partitionable, multi-tenant environment will fail.

A JDBC store is a JDBC-accessible database for storing subsystem data, such as persistent JMS messages and durable subscriber information. JDBC stores require administrators to configure a data source JNDI name. A JDBC store obtains a partitioned data source from its partition's JNDI. This means they will implicitly place their tables in its partition's backing database. The JDBC store looks up a data source into JNDI. The partition ID is on the thread when store life-cycle callbacks is called upon from deployment runtime. The JDBC store creates the initial context using the deployment thread in order to ensure that these entities are bound into the correct JNDI name-space.

Certain components configure and instantiate internal file or JDBC stores that are used solely by that component. Examples of this included diagnostic file stores, JMS server file-based paging stores, and JTA transaction log-in-database (TLOG-in-DB) stores. The corresponding application server components that own each of these internal stores determine the scope of these stores.

In accordance with an embodiment, each partition can designate a special separate root directory for temporary files, allowing temporary files in a different directory than transactional files for performance and scalability reasons. Examples of temporary files include JMS server paging files, and custom file stores in direct-write-with-cache mode that create cache files.

Store components use system and default work managers in various places. In accordance with an embodiment, work managers are associated with partitions, including system and default work managers. Partition administrators can optionally override work managers configuration for their own partitions. For partition scoped store components, partition-specific work managers are used when possible.

Default file stores and custom stores instances are also JTA XAResources. JTA are mostly non-partitioned, except that default transaction timeouts for JTA are settable at the partition level and runtime diagnostics can filter by tenant. Partitioned XAResource names are decorated with the appropriate partition name. The store XAResource name is constructed based on the store MBean name, and the MBean name of a partitioned store are decorated with the partition name by OA&M. If MBeans names are not unique per partition, additional code is added to ensure that the resource name is decorated with partition name.

Administrators can monitor store runtime statistics, and perform runtime operations via store runtime MBeans. For partition-scoped store instances, the runtime MBeans can be created and registered with the admin server in the context of a partition. To correctly partition runtime MBeans, a store can register top level MBeans (e.g., PersistentStoreRuntime) at the partition root of the runtime MBean hierarchy.

Store components write log messages into server and domain log files. In a partitionable, multi-tenant environment, the current partition of the store component is reported in partitioned component log messages by default. The logging framework ensures that this happens automatically based on the partition ID of the current thread. For partitioned component log messages that should not be exposed to a partition admin, an "exclude_partitioned" attribute in the catalog entry of the log message is set.

Store components use the timer service for various timeout and periodical operations. In accordance with an embodiment, if a timer is created within a scope of a partition, when the timer fires the execute thread it will have the right partition ID in the callback.

A partitionable, multi-tenant environment can enable partition migration from one cluster to another. However, partition migration can be problematic for store component state, with application data possibly being trapped in an old location. In accordance with an embodiment, store components can be prevented from participating in live or soft migration of an active partition, reducing a risk of double booting the same stores in two different places, which may result in data corruption.

A partitionable, multi-tenant environment can also enable importing and exporting of partitions from one domain to another. In accordance with an embodiment, store configuration artifacts within a partition can participate in an import and/or an export, however, persistent data will not.

A file store can participate in partition resource management resource usage tracking by ensuring that all of its threads have the correct component invocation context (CIC) for its partition, but will prevent itself from being subject to recourses that could cause an arbitrary open/write/read call to throw an exception.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting messaging in an application server environment, comprising:
one or more computers having memory and at least one processor, including the application server environment executing thereon that enables deployment and execution of software applications, wherein the application server environment includes a domain configuration that defines an application server domain for execution of the software applications, and a plurality of partitions of the application server domain;
a plurality of deployable resources available for use within the application server environment;
one or more resource groups that enable partition-specific information for one or more of the deployable resources;
wherein each partition of the plurality of partitions, is associated with a partition configuration and provides a subdivision of the application server domain, includes one or more of the resource groups, and is associated with a tenant;
wherein when a resource group of the one or more resource groups within a particular partition of the plurality of partitions references a resource group template, information associated with the particular partition is used in combination with the referenced resource group template, to indicate the partition-specific information for the one or more of the deployable resources;
one or more message service resources defined within a resource group, and instantiated within a partition from the plurality of partitions to enable messaging for applications deployed within the partition and between the plurality of partitions; and
a custom store defined within the referenced resource group template and instantiated within the partition for use by the one or more resources, wherein components of the custom store are fully scoped to the partition and exist in an isolated name-space or isolated directory location for the partition;
wherein the application server environment is configured to migrate the partition from a first cluster of servers to a second cluster of servers by targeting the resource group associated with the partition to both the first cluster and the second cluster and storing messages in a location accessible from both the first cluster and the second cluster, and whereupon the resource group migrating from the first cluster to the second cluster, mappings associated with the message service are unbound from a name-space of the partition in the first cluster and bound to a name-space of the partition in the second cluster.

2. The system of claim 1, wherein import and export of partitioned file store data is prevented, as is migration of file store data from one cluster of servers to another.

3. The system of claim 1, wherein the one or more message service resources are Java Message Service (JMS) resources and include JMS connection factories and their child resources associated with the partition for which they are configured.

4. The system of claim 3, wherein the one or more JMS resources includes default connection factories available to applications in partitions.

5. A method for supporting messaging in an application server environment, comprising:

providing, at one or more computers having memory and at least one processor, the application server environment executing thereon that enables deployment and execution of software applications, wherein the application server environment includes a domain configuration that defines an application server domain for execution of the software applications, and a plurality of partitions of the application server domain;

providing a plurality of deployable resources available for use within the application server environment;

providing one or more resource groups that enable partition-specific information for one or more of the deployable resources;

wherein each partition of the plurality of partitions, is associated with a partition configuration and provides a subdivision of the application server domain, includes one or more of the resource groups, and is associated with a tenant;

wherein when a resource group of the one or more resource groups within a particular partition of the plurality of partitions references a resource group template, information associated with the particular partition is used in combination with the referenced resource group template, to indicate the partition-specific information for the one or more of the deployable resources;

providing one or more message service resources are defined within a resource group, and instantiated within a partition from the plurality of partitions to enable messaging for applications deployed within the partition and between the plurality of partitions; and providing a custom store defined within the referenced resource group template and instantiated within the partition for use by the one or more resources, wherein components of the custom store are fully scoped to the partition and exist in an isolated name-space or isolated directory location for the partition;

wherein the application server environment is configured to migrate the partition from a first cluster of servers to a second cluster of servers by targeting the resource group associated with the partition to both the first cluster and the second cluster and storing messages in a location accessible from both the first cluster and the second cluster, and whereupon the resource group migrating from the first cluster to the second cluster, mappings associated with the message service are unbound from a name-space of the partition in the first cluster and bound to a name-space of the partition in the second cluster.

6. The method of claim 5, wherein import and export of partitioned file store data is prevented, as is migration of file store data from one cluster of servers to another.

7. The method of claim 5, wherein the one or more message service resources are Java Message Service (JMS) resources and include JMS connection factories and their child resources associated with the partition for which they are configured.

8. The method of claim 7, wherein the one or more JMS resources includes default connection factories available to applications in partitions.

9. A non-transitory computer readable storage medium, including instructions stored thereon which when read and executed by one or more computers having memory and at least one processor cause the one or more computers to perform a method comprising:

providing an application server environment that enables deployment and execution of software applications, wherein the application server environment includes a domain configuration that defines an application server domain for execution of the software applications, and a plurality of partitions of the application server domain;

providing a plurality of deployable resources available for use within the application server environment;

providing one or more resource groups that enable partition-specific information for one or more of the deployable resources;

wherein each partition of the plurality of partitions, is associated with a partition configuration and provides a subdivision of the application server domain, includes one or more of the resource groups, and is associated with a tenant;

wherein when a resource group of the one or more resource groups within a particular partition of the plurality of partitions references a resource group template, information associated with the particular partition is used in combination with the referenced resource group template, to indicate the partition-specific information for the one or more of the deployable resources;

providing one or more message service resources are defined within a resource group, and instantiated within a partition from the plurality of partitions to enable messaging for applications deployed within the partition and between the plurality of partitions; and providing a custom store defined within the referenced resource group template and instantiated within the partition for use by the one or more resources, wherein components of the custom store are fully scoped to the partition and exist in an isolated name-space or isolated directory location for the partition;

wherein the application server environment is configured to migrate the partition from a first cluster of servers to a second cluster of servers by targeting the resource group associated with the partition to both the first cluster and the second cluster and storing messages in a location accessible from both the first cluster and the second cluster, and whereupon the resource group migrating from the first cluster to the second cluster, mappings associated with the message service are unbound from a name-space of the partition in the first cluster and bound to a name-space of the partition in the second cluster.

10. The non-transitory computer readable storage medium of claim 9, wherein import and export of partitioned file store data is prevented, as is migration of file store data from one cluster of servers to another.

11. The non-transitory computer readable storage medium of claim 9, wherein the one or more message service resources are Java Message Service (JMS) resources and include JMS connection factories and their child resources associated with the partition for which they are configured.

12. The non-transitory computer readable storage medium of claim 11, wherein the one or more JMS resources includes default connection factories available to applications in partitions.

* * * * *

UNITED STATES PATENT AND TRADEMARK OFFICE
CERTIFICATE OF CORRECTION

Page 1 of 1

PATENT NO. : 10,476,938 B2
APPLICATION NO. : 14/865758
DATED : November 12, 2019
INVENTOR(S) : Barnes et al.

It is certified that error appears in the above-identified patent and that said Letters Patent is hereby corrected as shown below:

In the Claims

In Column 18, Line 52, in Claim 9, after "more" insert -- JMS --.

Signed and Sealed this
Ninth Day of February, 2021

Drew Hirshfeld
*Performing the Functions and Duties of the
Under Secretary of Commerce for Intellectual Property and
Director of the United States Patent and Trademark Office*